(12) United States Patent
Gryska et al.

(10) Patent No.: US 6,221,198 B1
(45) Date of Patent: Apr. 24, 2001

(54) METHOD OF STABILIZING FILMS OR MEMBRANES USING ADHESIVE AS A RESERVOIR

(75) Inventors: Stefan H. Gryska; Ronald S. Steelman, both of Woodbury; Loren R. Schreader, Lino Lakes; Clinton P. Waller, Jr., White Bear Lake; Joseph W. Frisk, St. Paul, all of MN (US); Steven B. Johnson, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/093,891

(22) Filed: Jun. 9, 1998

(51) Int. Cl.$^7$ ........................................................ C09J 7/02
(52) U.S. Cl. .................. 156/325; 156/DIG. 20; 428/355 R; 428/913; 430/97; 427/208.4
(58) Field of Search .................. 156/325, DIG. 20; 428/355 R, 343, 913; 427/208.4; 430/97

(56) References Cited

U.S. PATENT DOCUMENTS

| Re. 24,906 | 12/1960 | Ulrich | 206/59 |
|---|---|---|---|
| 2,973,826 | 3/1961 | Barnhart | 182/91 |
| 3,389,827 | 6/1968 | Abere et al. | 220/53 |
| 3,957,724 | 5/1976 | Schurb et al. | 260/46.5 E |
| 3,997,702 | 12/1976 | Schurb et al. | 428/352 |
| 4,112,213 | 9/1978 | Waldman | 326/279 |
| 4,310,509 | 1/1982 | Berglund | 424/28 |
| 4,313,988 | 2/1982 | Koshar | 428/40 |
| 4,323,557 | 4/1982 | Rosso et al. | 424/28 |
| 4,539,256 | 9/1985 | Shipman | 428/315.5 |
| 4,567,073 | 1/1986 | Larson et al. | 428/40 |
| 4,605,592 | 8/1986 | Paquette et al. | 428/334 |
| 4,614,667 | 9/1986 | Larson et al. | 427/54.1 |
| 5,643,676 | 7/1997 | Dobashi et al. | 428/411.1 |

FOREIGN PATENT DOCUMENTS

| 0 051 935 A2 | 5/1982 | (EP) | A61F/13/02 |
|---|---|---|---|
| 0 570 515 B1 | 11/1993 | (EP) | C09J/7/02 |
| WO 97/30852 | 8/1997 | (WO) | B41M/7/00 |

OTHER PUBLICATIONS

"Poly(phenylene Ether) to Radical Polymerization", *Encyclopedia Of Polymer Science And Engineering*, vol. 13, 2d ed., (1988) p. 289.
Product Brochure: "Print Guard™—UV Laminating Materials" (Seal Products, Inc. 10/90).

*Primary Examiner*—Daniel Zirker
(74) *Attorney, Agent, or Firm*—Dale A. Bjorkman

(57) ABSTRACT

Environmental stabilizing agents are stored in an adhesive adjoining, directly or indirectly, a film or membrane that requires protection from the environment. Such stabilizing agents include ultra-violet protectors and anti-oxidants. Migration of such environmental stabilizing agents from an adhesive to a film or membrane permits the use of new and different materials for such films and membranes because their method of manufacture no longer needs to accommodate the heat and processing sensitivities of the stabilizing agents.

12 Claims, 1 Drawing Sheet

METHOD OF STABILIZING FILMS OR MEMBRANES USING ADHESIVE AS A RESERVOIR

FIELD OF INVENTION

This invention relates to using a field of adhesive adhered to a film or membrane as a reservoir for environmental stabilizing agent(s).

BACKGROUND OF INVENTION

Image graphics are omnipresent in modern life. Images and data that warn, educate, entertain, advertise, etc. are applied on a variety of interior and exterior, vertical and horizontal surfaces. Nonlimiting examples of image graphics range from advertisements on walls or sides of trucks, to posters that advertise the arrival of a new movie, to warning signs near the edges of stairways.

Image graphics are increasingly made using digital techniques. Among popular digital techniques are electrographic processes and ink jet printing.

Electrographic printing processes can use dry or liquid toners. Electrographic printing processes can employ either (a) electrophotographic printers where the means of imaging consists of applying a latent charged image to a drum, developing this image with a toner and transferring this to paper or film or (b) electrostatic printers where a nib array writes a latent image on a dielectic coated paper or film which then passes a series of toning stations to generate a visible image.

Conventional liquid toner comprises pigmented resin particles, isoparaffinic hydrocarbon carrier liquid (such as Isopar™ branded liquid), and charge control agent to effect electrical properties. Although pigment, resin, and charge control agent will each be present in the liquid toner, proper toning of the latent image occurs only when the toner particle is composed of all three components.

Nonlimiting examples of commercial electrostatic printers are multi-pass and single-pass electrostatic printers, such as those marketed by Raster Graphics of Sunnyvale, Calif., the ColorgraiX division of Xerox Corporation of San Jose, Calif., Minnesota Mining and Manufacturing Company (3M) of St. Paul, Minn., and Nippon Steel Calcomp Corporation of Tokyo, Japan. 3M markets a number of media, toners, and overlaminates under the Scotchprint™ brand to be used in electrostatic printing. 3M also markets Graphic Maker Electrostatic Printing software useful in converting digital images from the Internet, ClipArt, or Digital Camera sources into signals to electrostatic printers to print such images.

The use of thermal and piezo ink jet inks have greatly increased in recent years with accelerated development of inexpensive and efficient ink jet printers, ink delivery systems, and the like.

Thermal ink jet hardware is commercially available from a number of multinational companies, including without limitation, Hewlett-Packard Corporation of Palo Alto, Calif., USA; Encad Corporation of San Diego, Calif., USA; Xerox Corporation of Rochester, N.Y., USA; LaserMaster Corporation of Eden Prairie, Minn., USA; and Mimaki Engineering Co., Ltd. of Tokyo, Japan. The number and variety of printers changes rapidly as printer makers are constantly improving their products for consumers. Printers are made both in desk-top size and wide format size depending on the size of the finished image graphic desired. Nonlimiting examples of popular commercial scale thermal ink jet printers are Encad's NovaJet Pro printers and H-P's DesignJet 650C, 750C, 2500CP, and 3500CP printers. Nonlimiting examples of popular desk-top thermal ink jet printers include H-P's DeskJet printers and OfficeJet printers.

3M also markets Graphic Maker Ink Jet software useful in converting digital images from the Internet, ClipArt, or Digital Camera sources into signals to thermal ink jet printers to print such images.

Ink jet inks are also commercially available from a number of multinational companies, particularly 3M which markets its Series 8551; 8552; 8553; and 8554 pigmented ink jet inks. The use of four principal colors: cyan, magenta, yellow, and black permit the formation of as many as 256 colors or more in the digital image.

Media for ink jet printers are also undergoing accelerated development. Because ink jet imaging techniques have become vastly popular in commercial and consumer applications, the ability to use a personal computer to print a color image on paper or other receptor media has extended from dye-based inks to pigment-based inks. And the media must accommodate that change. Pigment-based inks provide more brilliant colors and more durable images because pigment particles are contained in a dispersion before being dispensed using a thermal inkjet print head.

Ink jet printers have come into general use for wide-format electronic printing for applications such as, engineering and architectural drawings. Because of the simplicity of operation and economy of ink jet printers, this image process holds a superior growth potential promise for the printing industry to produce wide-format, image-on-demand, presentation-quality graphics.

Image quality is what the viewing public and paying customers will want and demand to see. From the producer of the image graphic, many other obscure demands are also placed on the ink jet media/ink system, or electrostatic media/toner system, from the print shop. Also, exposure to the environment can place additional demands on the media and ink (depending on the application of the graphic).

Image quality must outlast the intended duration of the image graphic in its placement, i.e., the image graphic must be durable in its intended environment. For example, it is expected that an outdoor image graphic adhered to the side of a tractor trailer must maintain its image quality for as much as seven to ten years, while the trailer travels through all types of inclement and sometimes brutal weather conditions. Often, it is a combination of ultra-violet light, heat, humidity, cold, wind, and other environmental extremes that causes a beautiful image to succumb to these natural elements that cause image fading or other weathering effects. Stabilizing agents (e.g., ultra-violet light absorbers, ultra-violet light stabilizers, antioxidants, heat stabilizers, and a variety of other additives) are often included in receptor media compositions to protect those media and the image on those media from weathering effects. The amount of the stabilizing agent can be limited by the composition or thickness of the film/membrane or solubility/compatibility of the stabilizing agents. This limit may be less than that required for the intended life of the graphic.

Often the image on the graphic is protected by the nature of the receptor media on which the image is printed if the media uses such stabilizing agents, regardless of the printing method described above. But more often, particularly for extremely durable image requirements, clear overlaminates are adhered to, or clear coatings cover, the image graphic.

Overlaminate films or clear coatings (also known as "clears" in the graphics industry) are expensive to produce and are limited in types of materials because of the clarity required for the exposed layer in the final, protected image graphic. Overlaminates and clears need the same environmental protection as the remainder of the graphic and often require more intense protection because of the purpose of the overlaminate or clear to protect and the requirement of continued clarity during image graphic placement for long durations of time.

SUMMARY OF INVENTION

What the art of image graphics needs is a method of providing environmental stabilizing agents in films and membranes to protect image graphics.

The present invention solves the problem of the art by providing a reservoir for environmental stabilizing agents in a field of adhesive adhered to films and membranes, in order that the films and membranes are continuously protected from environmental effects via migration of such stabilizing agents from the adhesive into the film or membrane.

For purposes of this invention, a "film" is distinguished from a "membrane" in that any porosity present in a film does not transcend the entire thickness of the film, whereas at least some porosity present in a membrane does transcend the entire thickness of the membrane to provide a fluid conduit between opposing surfaces.

One aspect of the present invention is a method for protecting a film or membrane, comprising the steps of: (a) loading into a field of adhesive at least one environmental stabilizing agent that reduces or slows the effect of light energy; and (b) adhering the field of adhesive to a film or membrane closer to the source of light energy in order to place the environmental stabilizing agent in contact with the film or membrane over a duration of time for protecting the film or membrane, and wherein the film or membrane itself has insufficient environmental stabilizing agent to provide protection during the expected lifetime of the film or membrane.

Preferably, the adhesive is loaded with additional types of environmental stabilizing agents described above.

A feature of the present invention is the ability to provide a reservoir of environmental stabilizing agent in an adhesive contacting a film or membrane to be protected from environmental effects over a duration of time.

An advantage of the present invention is the ability to provide the protection for the film or membrane from adjoining adhesive.

Unexpectedly, the method of the present invention not only provides protection for the film or membrane adjoining the field of adhesive, but also, when the reservoir adhesive adjoins a membrane, other layers in a composite forming the final image graphic. More specifically, if the reservoir adhesive adjoins a membrane prepared according the disclosure of U.S. Pat. No. 4,539,256 (Shipman et al.) or a microporous membrane commercially available under the brand Teslin™ (from PPG Industries of Pittsburgh, Pa., USA), the stabilizing agents migrate through the membrane into adhesive adjoining that membrane and also to an overlaminate film. Significantly, the environmental stabilizing agents in a reservoir have been found to migrate across two different layers of two different materials to protect a third layer of a third material. Thus, another advantage of this aspect of the present invention is the ability to use films as overlaminates that might not contain any environmental stabilizing agents yet such overlaminate becomes protected via environmental stabilizing agents that have migrated from other layers in the final image graphic. This advantage expands the list of overlaminate candidates to materials that previously could not be employed as overlaminates for exterior durability.

Another aspect of the present invention is a film or membrane protected by an adjoining field of adhesive containing an adhesive delivery system for environmental stabilizing agents that reduces or slows the effect of light energy, wherein such adjoining is direct or indirect, and wherein the film or membrane itself has insufficient environmental stabilizing agent to provide protection during the expected lifetime of the film or membrane.

"Adhesive delivery system" means the use of adhesive to provide a reservoir for environmental stabilizing agents and to facilitate the migration of such agents from the adhesive into adjoining film(s) or membrane(s). Use of this adhesive delivery system eliminates problems which occur in the two most common methods used for incorporating the most common environmental stabilizing agents (i.e., ultra-violet additives and antioxidants) into polyolefin films: extrusion and coating. A ultra-violet/antioxidant package frequently cannot be directly extruded because of the low decomposition temperatures of its components. In other cases, the destructive effect of the ultra-violet additives on nucleation of poly(propylene) is a problem, including for a Thermally Induced Phase Separation (TIPS) process disclosed in U.S. Pat. No. 4,539,256, (Shipman et al.). The "adhesive delivery system" of the present invention solves these problems.

Coating methods also have some limitations. First of all, the extra step required in film preparation is expensive and time consuming and involves safety and environmental issues. Most of the solvents used for coating are flammable liquids that require special production facilities. Furthermore the quantity of stabilizing agents is limited by the solubility in the coating and the thickness of the coating. Again, incorporation of ultra-violet stabilizing additives and antioxidants into the adhesive can solve these problems. Another consideration is that many of the ultra-violet stabilizing additives, which are yellow or amber, affect the color of the extruded or coated films, which can be especially critical for an overlaminate usage. Color change is very undesirable, especially in optical and graphics applications, and more especially for overlaminates. Using an ultra-violet stabilizing package in the adhesive eliminates this problem as well because the limited amount of migration of ultra-violet stabilizing additives minimizes a perceptible color change in the overlaminate but still provide sufficient ultra-violet light protection.

Another advantage of the invention is that the method of the present invention does not adversely affect the printing process on the film or membrane, regardless of the imaging method employed.

The embodiments below, discussed in conjunction with the following drawings, will describe further features and advantages.

EMBODIMENTS OF INVENTION

Image Graphic Construction

Figure 1:
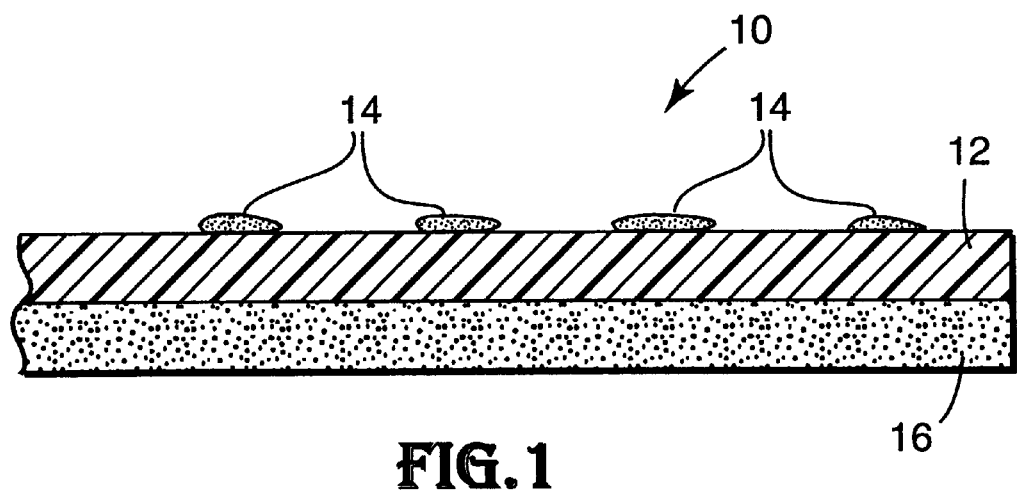
FIG. 1 is a cross-section of an image graphic without an overlaminate.

FIG. 1 shows minimal elements of a typical image graphic 10, comprising an image receptor 12, having an image 14 printed on one surface of the image receptor 12 and having a field 16 of adhesive adjoining (typically via adhesion) an opposing surface of the image receptor 12. Nonlimiting examples of printing of image 14 includes electrographic (both electrostatic and electrophotographic), inkjet (both thermal and piezo), thermal mass transfer, thermal dye sublimation, screen printing, and the like.

Figure 2:
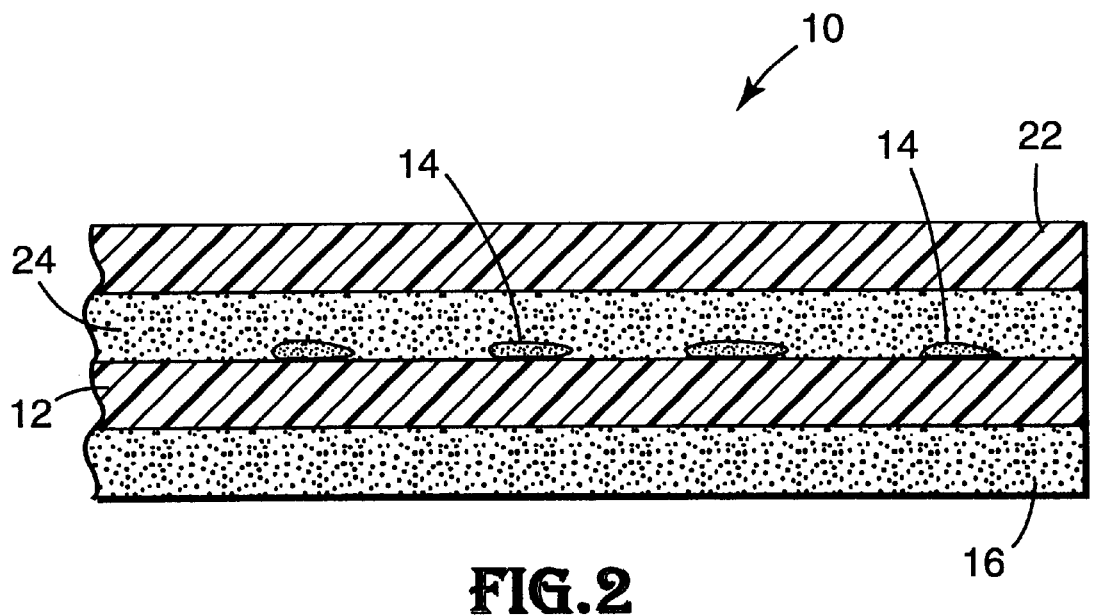
FIG. 2 is a cross-section of the image graphic of FIG. 1 after an overlaminate has been added.

FIG. 2 shows the typical image graphic 10, also having an overlaminate film 22 adhered to image 14 and image receptor using a second field 24 of adhesive.

The method of the present invention provides a reservoir of environmental stabilizing agents in field 16 of adhesive, whereby that reservoir serves to protect receptor 12 alone as in FIG. 1 or also overlaminate 22 as in FIG. 2.

Films or Membranes

Any film or membrane suitable for image graphics applications is acceptable for use and protection via the method of the present invention. This invention permits use of films or membranes that otherwise would be difficult or unable to have environmental stabilizing agent(s) included therein. Typical polymeric materials include polyolefins, polyesters, polyurethanes, ethylene vinyl acetates, acrylic polymers. Minnesota Mining and Manufacturing Company (3M) markets a wide variety of films and membranes that can be protected according to the present invention. Teslin™ branded films are also good candidates. An advantage of this invention is that one skilled in the art of making image graphics can choose previously made films or membranes that do not have sufficient environmental stabilizing agents for the present intended use and use them with an adhesive delivery system of the present invention in a new combination that provides sufficient environmental stabilizing agent (s) to the previously insufficient film or membrane via migration from the adhesive to the film or membrane.

Nonlimiting examples of preferred films or membranes are disclosed in U.S. Pat. Nos. 4,539,256 (Shipman et al.); U.S. Pat. No. 5,106,710 (Wang et al.); U.S. Pat. No. 5,721,086 (Emslander et al.); U.S. Pat. No. 5,681,660 (Bull et al.) and PCT Publication No. WO 97/30852 (Bull); the disclosures of which are incorporated herein by reference as if rewritten herein. As shown in the Bull et al. patent and the Bull publication, such films are used as overlaminates. Thus, the films and membranes suitable for element 12 as seen as FIG. 1 also can serve for element 22 as seen FIG. 2. Regardless, the method of the present invention can protect such film or membrane located in either place and used as image receptor 12 or as overlaminate 22.

Preferably, the membrane can be a microporous membrane having impregnated therein a fluid management system and a pigment management system according to the disclosure of copending, coassigned, U.S. patent application Ser. No. 08/892,902 (Waller et al.), the disclosure of which is incorporated herein by reference. Briefly, the inkjet receptor can comprise a microporous membrane impregnated with an inorganic multivalent metal salt together with a surfactant or combination of surfactants chosen for the ink and membrane being employed or a microporous membrane impregnated with a microporous fluorinated silica agglomerate together with a binder and a surfactant or a combination of surfactants for the ink and membrane being employed. Moreover, the inkjet receptor can comprise a microporous membrane impregnated with a microporous fluorinated silica agglomerate together with a binder and a surfactant or combination of surfactants wherein the said surfactants are selected from the group of hydrocarbon-based anionic surfactants, silicon-based non-ionic surfactants or fluorocarbon-based non-ionic based surfactants or a combination thereof. Any of these treated membranes are an excellent inkjet receptor medium for printing of image graphics.

Adhesives

Any adhesive suitable for image graphics that can also serve as a reservoir for environmental stabilizing agents can be used in the present invention. A number of adhesives are marketed by 3M in association with the films or membranes identified above are suitable for this reservoir usage. Adhesives can include hot melt adhesives, actinic radiation reactive adhesives, and the like. The adhesives can be solvent-based adhesives, 100% solids adhesives, or latex-based adhesives.

Nonlimiting examples of such adhesive can be any conventional pressure sensitive adhesive that adheres to both receptor 12 and to the surface of the item upon which the image graphic is destined to be placed. Pressure sensitive adhesives are generally described in Satas, Ed., *Handbook of Pressure Sensitive Adhesives* 2nd Ed. (Von Nostrand Reinhold 1989), the disclosure of which is incorporated by reference. Pressure sensitive adhesives are commercially available from a number of sources. Particularly preferred are acrylate pressure sensitive adhesives commercially available from Minnesota Mining and Manufacturing Company of St. Paul, Minn. and generally described in U.S. Pat. No. 2,973,826; Re 24,906; Re 33,353; U.S. Pat. Nos. 3,389,827; 4,112,213; 4,310,509; 4,323,557; 4,732,808; 4,917,928; 4,917,929; 5,141,790; 4,605,592; 5,045,386; 5,229,207; 5,296,277; and 5,670,557, and EPO Patent Publications EP 0 051 935 and EP 0 570 515 B1, and those adhesives disclosed in copending, coassigned, U.S. patent application Ser. No. 08/775,844 (Sher et al.) (all of which are incorporated herein by reference).

Release liners to protect the adhesive before usage are also well known and commercially available from a number of sources. Nonlimiting examples of release liners include silicone coated kraft paper, silicone coated polyethylene coated paper, silicone coated or non-coated polymeric materials such as polyethylene or polypropylene, as well as the aforementioned base materials coated with polymeric release agents such as silicone urea, urethanes, and long chain alkyl acrylates, such as defined in U.S. Pat. Nos. 3,957,724; 4,567,073; 4,313,988; 3,997,702; 4,614,667; 5,202,190; and 5,290,615; the disclosures of which are incorporated by reference herein and those liners commecially available as Polyslik brand liners from Rexam Release of Oakbrook, Ill., USA and EXHERE brand liners from P.H. Glatfelter Company of Spring Grove, Pa., USA.

Environmental Stabilizing Agents

Environmental stabilizing agents can be selected from any of the many compositions that assist image graphics to remain durable for the intended duration of placement. This invention employs at least one environmental stabilizing agent, namely one that reduces or slows the effect of light energy. Preferably the invention employs additional types of stabilizing agents.

Often, the image graphic is placed on a surface and warrantied to remain free from defects in materials or workmanship for a specific period of time. Matching of the components to form the image graphic is key to the ability by the manufacturer to issue a warranty for its finished product. Thus, the environmental stabilizing agents are key components in the marketing of image graphics. This invention extends the usage of such environmental stabilizing agents by housing them in an adhesive for protection of adjoining layer(s).

Environmental stabilizing agents can be classified into the following categories: those agents that reduce or slow the effect of light energy; those that reduce or slow the effect of reaction with the environment; and those that reduce or slow the effect of reaction within the components of the image graphic.

Nonlimiting examples of agents that reduce or slow the effect of light energy include ultra-violet light absorbers (UVA), ultra-violet light stabilizers, hindered amine light stabilizers (e.g., Tinuvin™ 123 commercially available from Ciba-Geigy of Hawthorne, N.Y., USA). Such agents can be present in the adhesive in amounts ranging from about 0.1 weight percent to about 20 weight percent and preferably from about 1 to about 5 weight percent of the total weight of the adhesive. These amounts are generally greater than that which a film or membrane candidate described above could itself contain at the time of manufacture.

Nonlimiting examples of those agents that reduce or slow the effect of reaction with the environment include antioxidants (e.g., Irganox 1010 commercially available from Ciba Geigy of Hawthorne, N.Y., USA), biocides (e.g., Kathon™ ICP biocides from Rohm and Haas of Philadelphia, Pa., USA), mildew resistant agents, and the like. Such agents can be present in the adhesive in amounts ranging from about 0.1 weight percent to about 2 weight percent and preferably from about 0.2 to about 1 weight percent of the total weight of the adhesive.

Nonlimiting examples of those agents that reduce or slow the effect of reaction within the components of the film or membrane include charge transfer agents, radical scavenging agents, and energy transfer agents. Such agents can be present in the adhesive in amounts ranging from about 0.1 weight percent to about 3 weight percent and preferably from about 0.2 to about 2 weight percent of the total weight of the adhesive.

Further embodiments are described in the following examples.

Examples

EXAMPLE 1

A polypropylene microporous membrane prepared using thermally induced phase separation techniques according the disclosures of U.S. Pat. No. 4,539,256 (Shipman et al.), U.S. Pat. No. 4,726,989 (Mrozinski), and more particularly U.S. Pat. No. 5,120,594 (Mrozinski), the disclosures of which are incorporated herein by reference, and had the following characteristics:

Thickness—0.091 mm (3.6 mil)
Porosity—41.9%
Bubble Point—0.52 $\mu$m
Gurley—24 s/50 cm$^3$ 5 pieces, of 2.54 cm by 5.08 cm, were cut from the membrane and attached to an aluminum plate in the following way:

Control Sample 1A—with 0.02 mm (1 mil) 3M Clear Application Adhesive 8560 (3M Commercial Graphics Division, St. Paul, Minn., USA)
Sample 1B—with 0.02 mm (1 mil) 2-methylbutylacylate/acrylic acid (90:10)
pressure sensitive adhesive ("Test Adhesive")
Sample 1C—with 0.05 mm (2 mil) Test Adhesive
Sample 1D—with 0.07 mm (3 mil) Test Adhesive
Sample 1E—with 0.10 mm (4 mil) Test Adhesive The adhesive of Control Sample 1A had no ultra-violet light stabilizers. The adhesive of Samples 1B–1E had 2.0% of Tinuvin 1130 UVA stabilizer, 3.5% of Tinuvin 123 hindered amine light stabilizer (HALS) and 0.4% of Irganox 1010 Antioxidant, all of which products are commercially available from Ciba-Geigy of Hawthorne, N.Y., USA.

The aluminum plate with attached samples was then placed in an accelerated testing device with testing performed according to American Society for Testing of Materials (ASTM) G 53–91 (1991) with 164 hours of Ultraviolet Light (UVA 340 nm) at 80° C., with 4 hours of condensation at 50° C. Control Sample 1A developed several cracks before reaching the 200 hours mark; whereas Samples 1B, 1C, 1D and 1E did not develop any cracks until 1500, 2000, 2500 and 3000 hours respectively. This Example shows that environmental stabilizing agents contained in and delivered from an adjoining adhesive field can protect a film or membrane that contains no environmental stabilizing agents itself. Moreover, with the variations in quantity of adhesive coatings and amount of the environmental stabilizing agents therein (even if the concentration remains constant among the various samples), one can control the amount of environmental stabilization provided by the adhesive delivery system of the present invention.

EXAMPLE 2

Another polypropylene membrane was prepared in the same manner as in Example 1 and had the following characteristics:

Thickness—0.167 mm (6.6 mil)
Porosity—42.0%
Bubble Point—0.58 $\mu$m
Gurley—16.2 s/50 cm$^3$ 5 pieces, of 2.54 cm by 5.08 cm (1 by 2 inches), were cut from the membrane having adhesives matching Control Sample A and Samples B–F and attached to aluminum plate in the following way:

Control Sample 2A—with 0.02 mm (1 mil) 3M Adhesive 8560
Sample 2B—with 0.02 mm (1 mil) Test Adhesive
Sample 2C—with 0.05 mm (2 mil) Test Adhesive
Sample 2D—with 0.07 mm (3 mil) Test Adhesive
Sample 2E—with 0.10 mm (4 mil) Test Adhesive The adhesive of Control Sample 2A had no UV stabilizers. The adhesive of Samples 2B–2E had 2.0% of Tinuvin 1130 UVA, 3.5% of Tinuvin 123 HALS and 0.4% of Irganox 1010 Antioxidant.

The aluminum plate with attached samples was then subjected to the same accelerated testing as in Example 1 Control Sample 2A developed several cracks before reaching 200 hours mark; Samples 2B, 2C, 2D and 2E did not develop any cracks until 1500, 2000, 2500 and 3000 hours respectively. The Example showed that other types of polymeric films or membranes could be protected in the same manner as in Example 1.

EXAMPLE 3

A polypropylene membrane was prepared as in Example 1 and had the following characteristics:

Thickness—0.12 mm (4.9 mil)
Porosity—85.6%
Bubble Point—1.0 $\mu$m
Gurley—4.3 s/50 cm$^3$ 2 pieces, of 2.54 cm by 5.08 cm, were cut from the membrane and attached to aluminum plate in the following way:

Control Sample 3A—with 0.02 mm (1 mil) 3M Adhesive 8560

Sample 3B—with 0.02 mm (1 mil) 3M Test Adhesive

The adhesive of Control Sample 3A had no UV stabilizers. The adhesive of Sample 3B had 2.0% of Tinuvin 1130 UVA, 3.5% of Tinuvin 123 HALS and 0.4% of Irganox 1010 Antioxidant.

The aluminum plate with attached samples was then subjected to the same accelerated testing as in Example 1, except for up to 500 hours. Control Sample 3A developed several cracks and its surface was chalking off before reaching the 200 hours mark; Sample 3B after 500 hours did not show any cracks and its surface was not chalking off. This Example shows that yet another polymeric membrane can be protected by the method of the present invention.

EXAMPLE 4

Dense 0.05 mm Stamark™ 7771 Gloss Clear Polypropylene Overlaminating Film (3M, St. Paul, Minn., USA) was used in this example.

2 pieces, of 2.54 cm by 5.08 cm, were cut from the film and attached to aluminum plate in the following way:

Control Sample 4A—with 0.02 mm (1 mil) 3M Adhesive 8560

Sample 4B—with 0.02 mm (1 mil) Test Adhesive

The adhesive of Control Sample 4A had no UV stabilizers. The adhesive of Sample 4B had 2.0% of Tinuvin 1130 UVA, 3.5% of Tinuvin 123 HALS and 0.4% of Irganox 1010 Antioxidant.

The aluminum plate with attached samples was then subjected to the same accelerated testing as in Example 1 except for up to 1000 hours. Sample A developed several cracks and flaked off before reaching the 200 hours mark; sample B after 1000 hours did not show any cracks or other visible changes. This Example shows that a commercially available overlaminate can be protected by the method of the present invention.

EXAMPLE 5

A high density polyethylene membrane was used in this example. The membrane had the following characteristics:

Thickness—0.06 mm (2.5 mil)
Porosity—83.1%
Bubble Point—0.27 μm
Gurley—21.1 s/50 cm³

2 pieces, of 2.54 cm by 5.08 cm, were cut from the film and attached to aluminum plate in the following way:

Control Sample 5A—with 0.02 mm (1 mil) 3M Adhesive 8560

Sample 5B—with 0.02 mm (1 mil) Test Adhesive

The adhesive of Control Sample 5A had no UV stabilizers. The adhesive of Sample 5B based adhesive RD1267 had 2.0% of Tinuvin 1130 UVA, 3.5% of Tinuvin 123 HALS and 0.4% of Irganox 1010 Antioxidant.

The aluminum plate with attached samples was then subjected to the same accelerated testing as in Example 1 except up to 500 hours. Control Sample 5A developed several cracks before reaching the 200 hours mark; Sample 5B after 500 hours did not show any cracks or other visible changes.

EXAMPLE 6

A polypropylene Oil-in membrane prepared as in Example 1 was used in this example. The membrane had the following characteristics:

Thickness—0.18 mm (7.17 mil)
Porosity—46.2%
Bubble Point—0.82 μm
Gurley—20.4 s/50 cm³
Antioxidant Irganox 1010—1.0%

2 pieces, of 2.54 cm by 5.08 cm, were cut from the membrane and attached to aluminum plate in the following way Control Sample 6A—with 0.02 mm (1 mil) 3M adhesive EP 0 570 515 B1

Sample 6B—with 0.02 mm (1 mil) 3M adhesive 3500S

The water-based adhesive of Control Sample 6A had no UV stabilizers. Sample 6B had 2.0% of Tinuvin 1130 UVA, 3.5% of Tinuvin 123 HALS in the same water-based adhesive as Control Sample 6A according to the following formulation:

| Butyl Cellosolve | 5.2 parts by weight |
|---|---|
| Tinuvin 1130 UVA | 1.9 |
| Tinuvin 123 HALS | 3.3 |
| Adhesive(at 40% solids) | 89.6 |

The preparation of Sample 6B employed the following steps:

1. Dissolve Tinuvin 1130 and Tinuvin 123 in butyl cellosolve.
2. Weigh 3500 adhesive into a container and stir at a moderate speed.
3. While stirring, slowly add the stabilizer premix. Continue to mix until well dispersed.

The aluminum plate with attached samples was then subjected to the same accelerated testing as in Example 1, except for up to 500 hours. Control Sample 6A developed several cracks before reaching the 200 hours mark; Sample 6B after 500 hours did not show any cracks or other visible changes.

EXAMPLE 7

Dense 0.05 mm (2 mil) Stamark TM 7771 Gloss Clear Polypropylene Overlaminating Film and a polypropylene (oil-in) membrane, were used in this example. The film was covered with an adhesive that did not contain any environmental stabilizing agents. The underlying membrane had the following characteristics:

Thickness—0.17 mm (6.70 mils)
Porosity—41.5%
Bubble Point—0.72 μm
Gurley—16.9 sec/50 cc 2 pieces, of 1.9 cm by 6.35 cm (¾"×2 ½"), were cut from the polypropylene membrane and laminated to the Stamark TN 7771 Polypropylene overlaminate.

Control Sample 7A—0.07 mm (3 mils) had a wet coat of the adhesive used in

Control Sample 6A

Sample 7B—0.07 mm (3 mils) had a wet coat of the adhesive of Sample 6B.

The aluminum plate with attached samples was then subjected to the same accelerated testing as in Example 1. Control Sample 7A, the membrane and the overlaminate film, developed several cracks after 500 hrs. Sample 7B did not show any cracks on either the membrane or the polypropylene overlaminate after 3000 hours or any other visible signs of degradation.

This Example showed that environmental stabilizing agents located in an adhesive beneath a membrane can migrate not only to protect the adjoining membrane but also migrate through the membrane and the adhesive of the overlaminate to protect the overlaminate film, three layers away from the reservoir of the adhesive.

The invention is not limited to above embodiments. The claims follow.

What is claimed is:

1. A method for protecting a film or membrane in UV exposure conditions, comprising the steps of:
   (a) selecting a film or membrane that will develop cracks upon exposure to 200 hours of ultraviolet light under ASTM G53–91 (1991) conditions when having no adhesive applied thereto;
   (b) applying to said film or membrane, an adhesive comprising at least one environmentally stabilizing agent that reduces or slows the effect of light energy, said stabilizing agent being present in an amount sufficient to provide protection such that said film or membrane having the adhesive applied thereto does not develop cracks upon exposure to 200 hours of ultraviolet light (UVA 340 nm.) under ASTM G53–91 (1991) conditions; and
   (c) exposing said adhesive-coated film or membrane to ultraviolet light conditions that would crack said film or membrane in the absence of said adhesive.

2. The method of claim 1, wherein the field of adhesive further comprises at least one other environmental stabilizing agent, and wherein the adhesive is selected from the group consisting of solvent-based adhesives, 100% solids adhesives, and latex-based adhesives.

3. The method of claim 2, wherein the other environmental stabilizing agent is selected from the group consisting of those agents that reduce or slow the effect of reaction with the environment and those agents that reduce or slow the effect of reaction within the components of the film or membrane.

4. The method of claim 1, wherein the environmental stabilizing agent migrates from the field of adhesive into the film or membrane adjoining the adhesive.

5. The method of claim 1, wherein the environmental stabilizing agent migrates from the field of adhesive through the film or membrane and into an adjoining second film or membrane.

6. The method of claim 1, wherein the environmental stabilizing agent is selected from the group consisting of ultra-violet absorbers, ultra-violet light stabilizers, hindered amine light stabilizers, and combinations thereof.

7. The method of claim 6, wherein the environmental stabilizing agent is present in the adhesive in an amount ranging from about 0.1 weight percent to about 20 weight percent of the total weight of the adhesive.

8. The method of claim 7, wherein the amount ranges from about 1 to about 5 weight percent of the total weight of the adhesive.

9. The method of claim 3, wherein the agents that reduce or slow the effect of reaction with the environment comprise anti-oxidants, biocides, or mildew resistant agents present in the adhesive in an amount ranging from about 0.1 weight percent to about 2 weight percent of the total weight of the adhesive.

10. The method of claim 3, wherein the agents that reduce or slow the effect of reaction within the components of the film or membrane comprise charge transfer agents, energy transfer agents, or radical scavenging agents present in the adhesive in an amount ranging from about 0.1 weight percent to about 3 weight percent of the total weight of the adhesive.

11. The method of claim 1, wherein the film or membrane comprises polypropylene.

12. The method of claim 1, wherein the film or membrane comprises polyethylene.

* * * * *